US012380860B2

(12) United States Patent
Lee et al.

(10) Patent No.: US 12,380,860 B2
(45) Date of Patent: Aug. 5, 2025

(54) ELECTROLUMINESCENT DISPLAY DEVICE

(71) Applicant: LG DISPLAY CO., LTD., Seoul (KR)

(72) Inventors: Jin Woo Lee, Paju-si (KR); Sung Won Lee, Paju-si (KR); Hee Young Chae, Paju-si (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 17/966,937

(22) Filed: Oct. 17, 2022

(65) Prior Publication Data

US 2023/0206861 A1 Jun. 29, 2023

(30) Foreign Application Priority Data

Dec. 24, 2021 (KR) ........................ 10-2021-0187457

(51) Int. Cl.
*G09G 3/3291* (2016.01)
*G09G 3/3233* (2016.01)
*G09G 3/3266* (2016.01)

(52) U.S. Cl.
CPC ......... *G09G 3/3291* (2013.01); *G09G 3/3266* (2013.01); *G09G 2300/0852* (2013.01); *G09G 2310/0278* (2013.01); *G09G 2310/08* (2013.01); *G09G 2320/0233* (2013.01)

(58) Field of Classification Search
None
See application file for complete search history.

(56) References Cited

U.S. PATENT DOCUMENTS

| | | | | |
|---|---|---|---|---|
| 5,841,410 | A * | 11/1998 | Oda | G09G 3/3648 345/94 |
| 2006/0267886 | A1* | 11/2006 | Ozaki | G09G 3/325 345/76 |
| 2016/0365031 | A1* | 12/2016 | Wu | G09G 3/3275 |
| 2017/0039941 | A1* | 2/2017 | Wu | G09G 3/3258 |
| 2019/0164494 | A1* | 5/2019 | Bae | G09G 3/3258 |
| 2019/0378457 | A1* | 12/2019 | Shen | G09G 3/3258 |

FOREIGN PATENT DOCUMENTS

| | | | |
|---|---|---|---|
| KR | 10-2007-0118451 | A | 12/2007 |
| KR | 10-2009-0089740 | A | 8/2009 |
| KR | 10-2014-0071734 | A | 6/2014 |

* cited by examiner

*Primary Examiner* — Sepehr Azari
(74) *Attorney, Agent, or Firm* — Fish & Richardson P.C.

(57) ABSTRACT

An electroluminescent display device includes a display panel including a plurality of pixels each having a light emitting element and a driving thin film transistor for controlling a driving current flowing through the light emitting element and connected to a data line and a gate line, a panel driver connected to the data line and the gate line, and a timing controller configured to control an operation of the panel driver such that the operation is divided into an emission period in which the light emitting element emits light and a non-emission period in which light emission is stopped and to perform control such that a data voltage is input through the data line during the non-emission period and light emitting elements to which the data voltage is applied simultaneously emit light during the emission period.

16 Claims, 12 Drawing Sheets

ELECTROLUMINESCENT DISPLAY DEVICE

CROSS-REFERENCE TO RELATED APPLICATION

This application claims the priority of Korean Patent Application No. 10-2021-0187457, filed on Dec. 24, 2021, which is hereby incorporated by reference in its entirety.

BACKGROUND

Field of the Disclosure

The present disclosure relates to an electroluminescent display device including driving elements for driving pixels.

Description of the Background

Electroluminescent display devices are roughly classified into an inorganic light emitting display device and an organic light emitting display device according to the material of an emission layer. Thereamong, an active matrix type organic light emitting display device includes an organic light emitting diode (referred to hereinafter as "OLED") that spontaneously emits light.

An organic light emitting display device has pixels that include OLEDs and are arranged in a matrix form and adjusts the luminance of the pixels according to the grayscale of image data. Each pixel basically includes a driving thin film transistor (TFT) that controls a driving current flowing through the OLED according to a gate-source voltage, and one or more switch TFTs for programming the gate-source voltage of the driving TFT.

The organic light emitting diode display has advantages of being thin, having low power consumption, high response speed, high luminous efficiency, high luminance, and a wide viewing angle and thus has been applied to various fields.

Accordingly, research to improve the performance of the organic light emitting display device, such as image quality, continues.

SUMMARY

Accordingly, the present disclosure is to provide an electroluminescent display device capable of reproducing uniform luminance in the entire area of a display panel by preventing or reducing generation of luminance deviation in the display panel area when a black data insertion (BDI) technique that inserts an emission off period within one frame is applied to improve the picture quality of the display device, and a method for driving the same.

To achieve these and other advantages and in accordance with the purpose of the present disclosure, as embodied and broadly described herein, an electroluminescent display device includes a display panel including a plurality of pixels each having a light emitting element and a driving TFT for controlling a driving current flowing through the light emitting element and connected to a data line and a gate line, a panel driver connected to the data line and the gate line, and a timing controller configured to control an operation of the panel driver such that the operation is divided into an emission period in which the light emitting element emits light and a non-emission period in which light emission is stopped and to perform control such that a data voltage is input through the data line during the non-emission period and light emitting elements to which the data voltage is applied simultaneously emit light during the emission period.

The timing controller can implement a black data insertion (BDI) operation by performing control such that an image is displayed during the emission period and a black image is displayed during the non-emission period.

The timing controller can perform control such that the data voltage is sequentially input to all pixel lines of the display panel during the non-emission period and all the pixel lines simultaneously emit light during the emission period.

The timing controller can divide horizontal pixel lines of the display panel into a plurality of blocks and perform control such that the data voltage is sequentially input in units of the divided blocks and horizontal pixel lines simultaneously emit light in units of blocks.

The timing controller can compensate for the data voltage based on a change in a low-level voltage according to light emission of the light emitting elements.

The panel driver can include a data driver configured to supply the data voltage to the data line, and a gate driver configured to sequentially output switch signals for inputting the data voltage and to simultaneously output an emission signal to pixels to which the data voltage is applied.

In another aspect of the present disclosure, an electroluminescent display device includes a display panel in which data lines intersect gate lines and a plurality of pixels is disposed, a data driver configured to supply a data voltage to the data lines, and a gate driver configured to sequentially output switch signals for inputting the data voltage and to simultaneously output an emission signal to pixels to which the data voltage is applied, wherein each of the pixels includes a light emitting element having an anode to which a high-level driving voltage is applied, a driving transistor connected between a cathode of the light emitting element and a low-level driving voltage to control a driving current of the light emitting element according to a voltage difference between a gate and a source, a switching transistor configured to connect a corresponding data line and a first node according to a corresponding switch signal, a light emitting transistor configured to connect the first node and a second node according to the emission signal, a first capacitor connected to the first node to be charged with a data voltage applied to the data line, and a second capacitor connected to the second node and a source node of the driving transistor to be charged with the data voltage charged in the first capacitor as a gate-source voltage of the driving transistor when the emission signal is input.

The first capacitor can be charged with the data voltage while the light emitting element is turned off.

The light emitting transistor can maintain an off state such that the data voltage is charged in the first capacitor when the switching transistor is turned on, and the switching transistor can maintain an off state such that the data voltage charged in the first capacitor is charged in the second capacitor when the light emitting transistor is turned on.

In the driving transistor, a drain electrode can be connected to the cathode of the light emitting element, a source electrode can be provided with the low-level driving voltage, and a gate electrode can be connected to the second node to control a magnitude of the driving current applied to the light emitting element according to a magnitude of the data voltage charged in the second capacitor.

In a further aspect of the present disclosure, an electroluminescent display device includes a light emitting element having an anode to which a high-level driving voltage is applied, a driving transistor connected between a cathode of the light emitting element and a low-level driving voltage to control a driving current of the light emitting element according to a voltage difference between a gate and a source, a switching transistor configured to connect a data line and a first node according to a switch signal, a first capacitor connected to the first node to be charged with a data voltage input to the data line, a light emitting transistor configured to connect the first node and a second node according to an emission signal, and a second capacitor connected to the second node and a source node of the driving transistor.

The first capacitor can be charged with the data voltage while the light emitting element is turned off.

The second capacitor can be charged with the data voltage charged in the first capacitor as a gate-source voltage of the driving transistor when the emission signal is input.

The light emitting transistor can maintain an off state such that the data voltage is charged in the first capacitor when the switching transistor is turned on, and the switching transistor can maintain an off state such that the data voltage charged in the first capacitor is charged in the second capacitor when the light emitting transistor is turned on.

A driving period for light emission of the light emitting element can include first to fourth periods, the switching transistor can be turned on and the light emitting transistor can be turned off such that the data voltage is charged in the first capacitor in the first period, the switching transistor and the light emitting transistor can be turned off such that the data voltage is held in the first capacitor in the second period, the switching transistor can be turned off and the light emitting transistor can be turned on such that the data voltage is charged in the second capacitor in the third period, and the driving transistor can be turned on according to the data voltage charged in the second capacitor to apply driving power to the light emitting element in the fourth period.

The electroluminescent display device of the present disclosure can prevent or reduce luminance deviation by writing image data for each line during an emission off period in which black data is displayed and causing pixels of all lines to simultaneously emit light upon completion of image data writing such that all the lines have the same duty.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
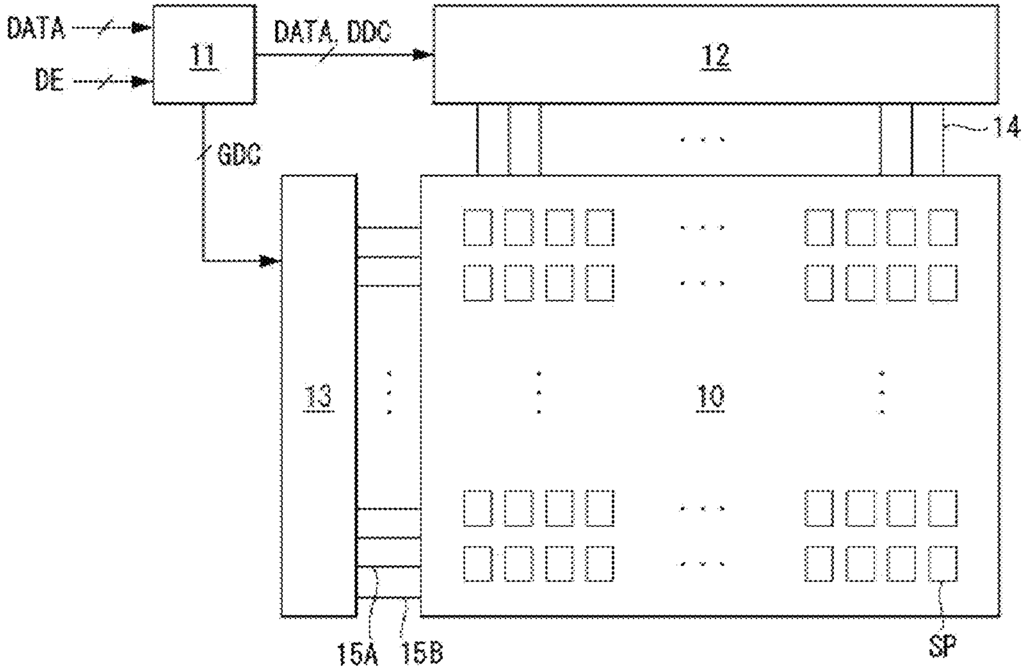
FIG. 1 is a control block diagram of an electroluminescent display device according to an aspect of the present disclosure.

The advantages and features of the present disclosure and the way of attaining the same will become apparent with reference to aspects described below in detail in conjunction with the accompanying drawings. The present disclosure, however, is not limited to the aspects disclosed hereinafter and can be embodied in many different forms. Rather, these exemplary aspects are provided so that this disclosure will be thorough and complete and will fully convey the scope to those skilled in the art. Thus, the scope of the present disclosure should be defined by the claims.

The shapes, sizes, ratios, angles, numbers, and the like, which are illustrated in the drawings in order to describe various aspects of the present disclosure, are merely given by way of example, and therefore, the present disclosure is not limited to the illustrations in the drawings. The same or extremely similar elements are designated by the same reference numerals throughout the specification. In the present specification, when the terms “comprise”, “include”, and the like are used, other elements may be added unless the term “only” is used. An element described in the singular form is intended to include a plurality of elements unless the context clearly indicates otherwise.

In the interpretation of constituent elements included in the various aspects of the present disclosure, the constituent elements are interpreted as including an error range even if there is no explicit description thereof.

In the description of the various aspects of the present disclosure, when describing positional relationships, for example, when the positional relationship between two parts is described using “on”, “above”, “below”, “aside”, or the like, one or more other parts may be located between the two parts unless the term “directly” or “closely” is used.

In the description of the various aspects of the present disclosure, although terms such as, for example, “first” and “second” may be used to describe various elements, these terms are merely used to distinguish the same or similar elements from each other. Therefore, in the present specification, an element modified by “first” may be the same as an element modified by “second” within the technical scope of the present disclosure unless otherwise mentioned.

In an electroluminescent display device of the present disclosure, a pixel circuit includes a driving element and a switch element. The driving element and the switch element may be implemented as at least one of an n-type transistor (NMOS) and a p-type transistor (PMOS). A transistor may be implemented as a thin film transistor (TFT) in a display panel. A transistor may be implemented as an oxide transistor having an oxide semiconductor pattern or a low temperature polysilicon (LTPS) transistor having an LTPS semiconductor pattern. A transistor is a three-electrode device including a gate, a source, and a drain. The source is an electrode that supplies carriers to the transistor. In the transistor, carriers begin to flow from the source. The drain is an electrode through which carriers exit the transistor. In the transistor, carriers flow from the source to the drain. In the case of an n-type transistor (NMOS), a source voltage is lower than a drain voltage such that electrons can flow from the source to the drain because carriers are electrons. In an n-type transistor (NMOS), current flows from the drain to the source. In the case of a p-type transistor (PMOS), a source voltage is higher than a drain voltage such that holes can flow from the source to the drain because carriers are holes. In a p-type transistor (PMOS), current flows from the source to the drain because holes flow from the source to the drain. It should be noted that the source and the drain of the transistor are not fixed. For example, the source and the drain may be changed according to an applied voltage. Accordingly, the present disclosure is not limited by the source and the drain of the transistor. In the following description, the source and the drain of the transistor will be referred to as first and second electrodes.

A gate signal of a transistor used as a switch element swings between a gate on voltage and a gate off voltage. The gate-on voltage is set to a voltage higher than the threshold voltage of the transistor, and the gate-off voltage is set to a voltage lower than the threshold voltage of the transistor. The transistor is turned on in response to the gate-on voltage and turned off in response to the gate-off voltage. In the case of an n-type transistor (NMOS), the gate-on voltage can be a gate high voltage (VGH) and the gate-off voltage can be a gate low voltage (VGL). In the case of a p-type transistor (PMOS), the gate-on voltage can be the gate low voltage VGL, and the gate-off voltage can be the gate high voltage VGH.

Hereinafter, various aspects of the present disclosure will be described in detail with reference to the accompanying drawings. In the following aspects, the electroluminescent display will be mainly described with respect to an organic light emitting display including an organic light emitting material. The technical spirit of the present disclosure is not limited to an organic light emitting display device and can be applied to an inorganic light emitting display device including an inorganic light emitting material.

Like reference numerals refer to substantially identical elements throughout the specification. In the following description, when it is determined that detailed description of a known function or configuration related to the present specification can unnecessarily obscure the subject matter of the present specification, the detailed description will be omitted.

FIG. 1 is a schematic block diagram of a display device according to an aspect of the present disclosure.

Referring to FIG. 1, the display device includes a display panel 10 including a plurality of pixels, a panel driver including a data driver 12 and a gate driver 13 for driving the display panel, and a timing controller 11 for controlling the operation of the panel driver.

In the display panel 10, a plurality of data lines 14 intersects a plurality of gate lines 15A and 15B, and pixels SP are disposed in a matrix form at intersections to form a pixel array. A plurality of horizontal pixel lines HL1 to HLn is provided in the pixel array, and one horizontal pixel line HL includes a plurality of pixels SP disposed adjacent to each other in a horizontal direction.

The gate lines 15A and 15B can include first gate lines 15A to which a switch signal is applied and second gate lines 15B to which an EM signal is applied. Each pixel SP can be connected to any one of the data lines 14, any one of the first gate lines 15A, and any one of the second gate lines 15B.

Each pixel SP can include a light emitting element (referred to hereinafter as an OLED) and switch elements such as a driving TFT and a switch TFT for driving the OLED. The pixel SP receives a high-level driving voltage EVDD and a low-level driving voltage EVSS from a power block (not shown). The OLEI) included in the pixel SP includes an anode, a cathode, and an organic compound layer formed therebetween. The organic compound layer includes a hole injection layer (HIL), a hole transport layer (HITL), an emission layer (EML), an electron transport layer (ETL) and an electron injection layer (EIL). When a power supply voltage is applied to the anode and the cathode, holes passing through the hole transport layer (HTL) and electrons passing through the electron transport layer (ETL) are moved to the emission layer (EML) and form excitons, and as a result, the emission layer (EML) generates visible light. The TFTs constituting the pixel SP can be implemented as a p-type, an n-type, or a hybrid type. In addition, the semiconductor layer of the TFTs constituting the pixel SP can include amorphous silicon, polysilicon, or oxide.

The timing controller 11 can receive input image data DATA and timing signals such as a data enable signal DE from the outside. The timing controller 11 can generate various control signals DDC and GDC necessary for driving operations of the data driver 12 and the gate driver 13 based on the timing signals input from the outside. The timing controller 11 converts the input image data DATA input from the outside such that it matches a data signal format used in the data driver 12 and outputs the converted image data DATA.

The data driver 12 converts the image data DATA in a digital data format into a data voltage according to the data timing control signal DDC and supplies the same to the data lines 14.

The gate driver 13 generates a scan signal in response to the gate timing control signal GDC supplied from the timing controller 11, supplies the scan signal to the first gate lines 15A, generates an EM signal and supplies the EM signal to the second gate lines 15B.

The timing controller 11 can use the timing control signals GDC and DDC to control a timing at which image data is written in the horizontal pixel lines HL1 to HLn of the display panel 10 and a light emission timing. The timing controller 11 can implement black data insertion (BDI) operation by operating in an emission period in which the pixels SP emit light and a non-emission period in which light emission is stopped. The timing controller 11 can input a data voltage through the data lines during the non-emission period and control the pixels SP to which the data voltage is applied such that the pixels SP simultaneously emit light during the emission period.

The data writing timing and the light emission timing controlled by the timing controller 11 will be described with reference to FIG. 2.

Figure 2:
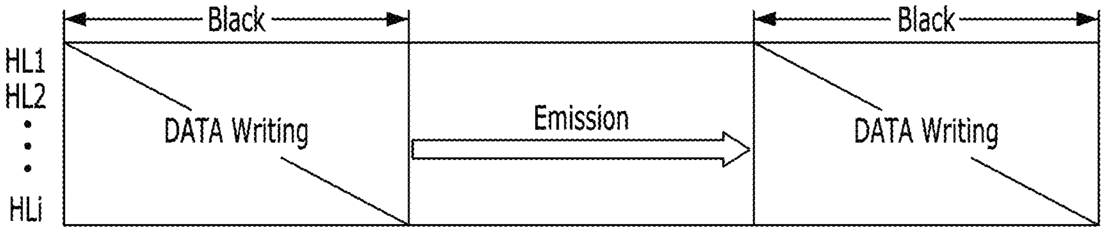
FIG. 2 is a diagram for describing a method for driving an electroluminescent display device according to an aspect of the present disclosure.

FIG. 2 is a diagram for describing a method for driving the electroluminescent display device according to an aspect of the present disclosure.

Referring to FIG. 2, the timing controller 11 can perform a black data insertion (BDI) operation for inserting black data into one frame. BDI refers to inserting an emission off period within one frame in order to alleviate TFT afterimage characteristics and improve video quality such as motion blur.

The timing controller 11 controls the data driver 12 and the gate driver 13 to sequentially write image data to the horizontal pixel lines HL in a period (Black) in which a black screen is displayed on the display panel 10 (DATA Writing).

When data writing is completed, the timing controller 11 can control the horizontal pixel lines HL1 to HLn in which the image data has been written to emit light at the same time. During the emission period, the OLED emits light according to image data written in each pixel to realize image data.

The timing controller 11 can control all horizontal pixel lines HL1 to HLn of the display panel 10 to emit light at the same time, or divide the n horizontal pixel lines into a plurality of blocks and control the horizontal pixel lines in each block to simultaneously emit light. As described above, when the horizontal pixel lines HL1 to HLn emit light at the same time, they all have the same emission duty, and thus a luminance deviation can be minimized.

Figure 3:
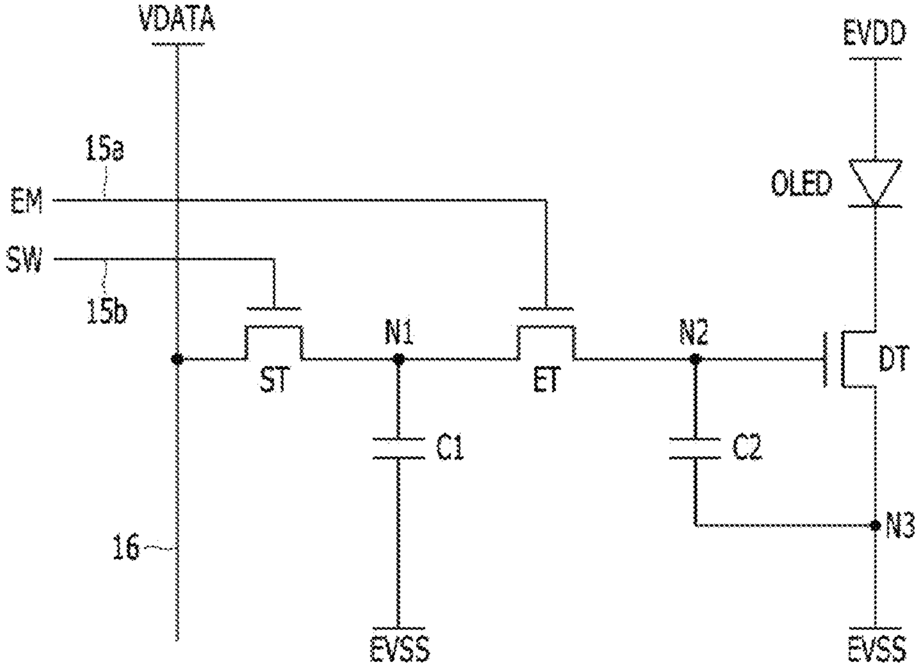
FIG. 3 is a circuit diagram of one pixel for implementing a driving technique according to the present disclosure.

FIG. 3 shows a configuration of one pixel for implementing a driving technique according to the present disclosure.

Referring to FIG. 3, the pixel according to the present disclosure can include an OLED, a driving thin film transistor (TFT) DT, a switch TFT ST, a light emitting TFT ET, a first capacitor C1, and a second capacitor C2. The driving TFT DT, the switch TFT ST, and the light emitting TFT ET have a gate electrode, a drain electrode, and a source electrode. A first electrode can be a drain electrode and a second electrode can be a source electrode. The driving TFT DT, the switch TFT ST, and the light emitting TFT ET can be implemented as a p-type, an n-type, or a hybrid type. In the following description, a case in which TFTs are implemented as an n-type will be exemplified.

The OLED includes an anode and a cathode. The anode of the OLED is provided with the high-level driving voltage EVDD and the cathode is connected to the drain node of the driving TFT DT. Emission luminance of the OLED can be adjusted according to the amount of driving current input to the anode.

The gate electrode of the driving TFT DT is connected to a second node N2, the drain electrode is connected to the cathode of the OLED, and the source electrode is provided with the low-level driving voltage EVSS. The driving TFT DT controls the amount of current flowing through the organic light emitting diode OLED according to a difference voltage Vgs between a gate voltage applied to the gate electrode and a source voltage applied to the source electrode.

One electrode of the light emitting TFT ET is connected to the first node N1, the other electrode thereof is connected to a second node N2, and an emission signal EM is input to the gate electrode thereof. The light emitting TFT ET is turned on when the emission signal EM is input at an on level to connect the first node N1 and the second node N2.

One electrode of the switch TFT ST is connected to the data line 16, the other electrode thereof is connected to the first node N1, and a switch signal SW is input to the gate electrode thereof. The switch TFT ST is turned on when the switch signal SW is input at an on level to connect the data line 16 and the first node N1. The switch TFT ST can be turned on by the switch signal SW to transmit a data voltage VDATA supplied to the data line 16 to the first node N1.

One electrode of the first capacitor C1 is connected to the first node N1 and the other electrode thereof is provided with the low-level driving voltage EVSS. Accordingly, when the switch TFT ST is turned on and thus the data line 16 is connected to the first node N1, the data voltage VDATA input through the data line 16 can be charged in the first capacitor C1 connected to the first node N1.

One electrode of the second capacitor C2 is connected to the second node N2 that is the gate node of the driving TFT DT, and the other electrode thereof is connected to a third node N3 that is the source node of the driving TFT DT. Accordingly, when the light emitting TFT ET is turned on, the first node N1 and the second node N2 are connected and thus the voltage of the first node N1 is reflected in the second node N2. The second capacitor C2 can reflect the voltage applied to the second node N2 as the gate-source voltage Vgs of the driving TFT DT.

As described above, the pixel according to the present disclosure may include the three TFTs DT, ST, and ET and the two capacitors C1 and C2 and is connected to one data line 16 without a separate reference line Vref.

Figure 4:
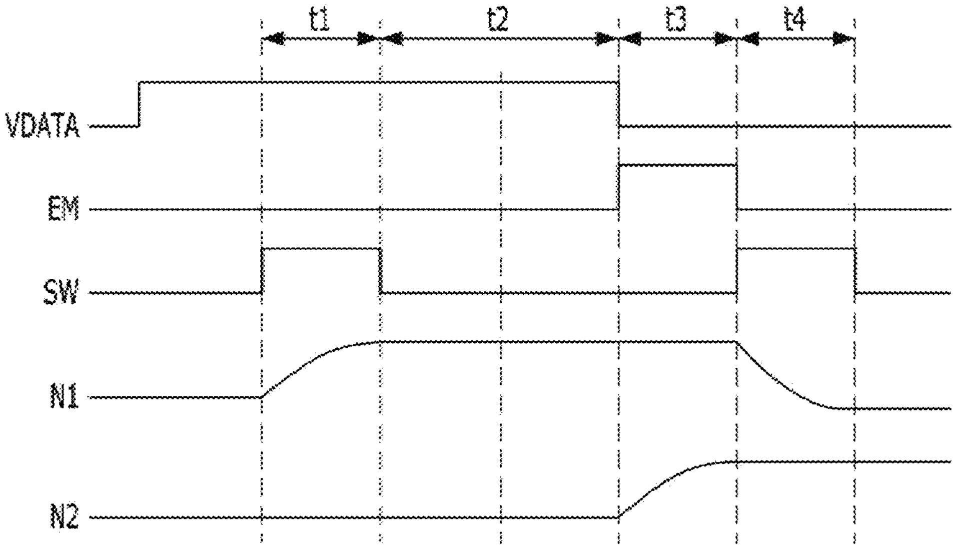
FIG. 4 is a waveform diagram of signals supplied to the pixel of FIG. 3.

FIG. 4 is a waveform diagram of signals supplied to the pixel of FIG. 3.

Referring to FIG. 4, the pixel driving method according to the aspect can include first to fourth periods t1 to t4.

The data voltage VDATA is applied as a high-level data voltage DATA_H having a high-level potential over the first and second periods t1 to t2 and applied as a low-level data voltage VDATA_L having a low-level potential during the third and fourth periods t3 to t4.

The emission signal EM is applied at an on level in the third period t3. Accordingly, the light emitting TFT ET receiving the emission signal EM is turned on in the third period t3 to connect the first node N1 and the second node N2.

The switch signal SW is applied at an on level in the first period t1, applied at an off level in the second and third periods t2 to t3, and applied at the on level in the fourth period t4. Accordingly, the switch TFT ST receiving the switch signal SW is turned on in the first period t1 to transfer the high-level data voltage VDATA_H input to the data line 16 to the first node N1, turned off in the second and third periods t2 to t3, and then turned on in the fourth period t4 to transfer the low-level data voltage VDATA_L to the first node N1.

According to the aforementioned driving waveforms, the image data VDATA is written to the first capacitor C1 in the first period t1, the written image data VDATA is held in the second period t2, and the image data VDATA stored in the first capacitor C1 is transferred to the second capacitor C2 in the third period, and thus the OLED can emit light in the fourth period t4.

The operation of the pixel in each period will be described in detail with reference to FIGS. 5 to 8.

Figure 5:
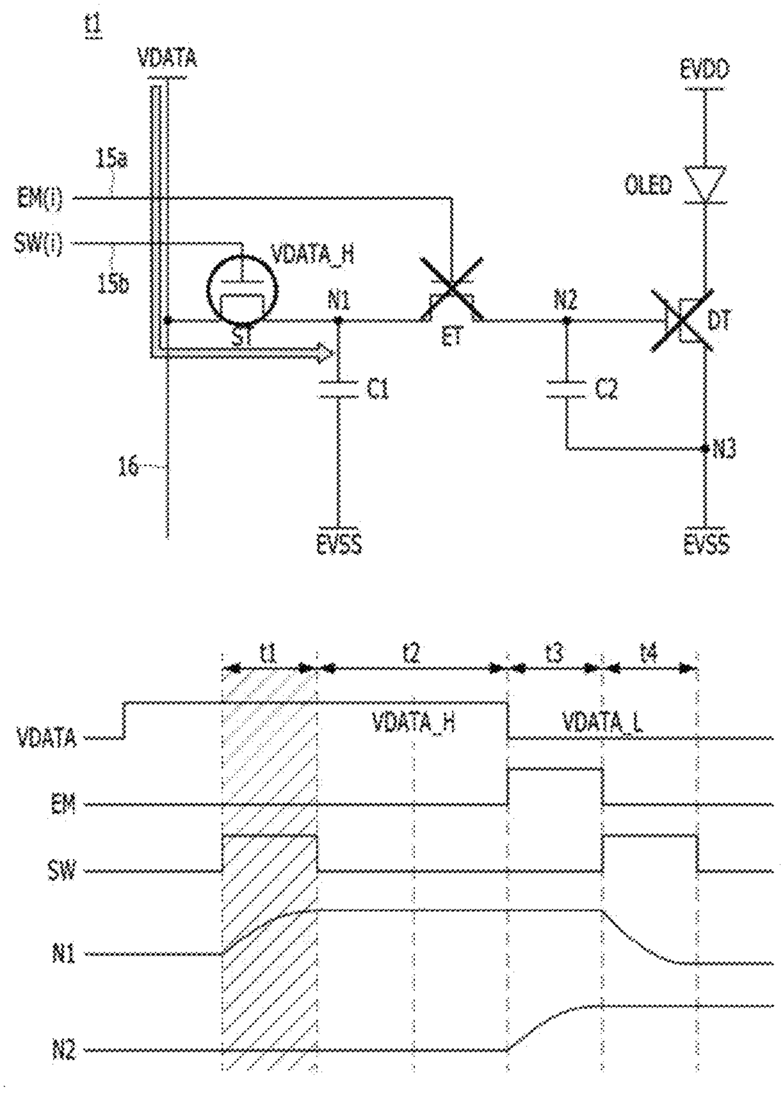
FIGS. 5 to 8 are diagrams for describing a method of driving a pixel.

FIG. 5 is a diagram for describing the operation of the pixel in the first period t1.

Referring to FIG. 5, in the first period t1, the high-level data voltage VDATA_H is applied to the data line 16, the switch signal SW is applied at the on level, and the emission signal EM is applied at the off level. Accordingly, in the first period t1, the switch TFT ST is turned on by receiving the on-level switch signal SW, and the light emitting TFT ET receives the off-level emission signal EM and maintains an off state.

As the switch TFT ST is turned on, the data line 16 and the first node N1 are connected. Accordingly, the high-level data voltage VDATA_H input to the data line 16 is transferred to the first node N1.

Since the light emitting TFT ET is in an off state, connection between the first node N1 and the second node N2 is canceled. Accordingly, the high-level data voltage VDATA_H applied to the first node N1 is charged in the first capacitor C1 connected to the first node N1, and thus the potential of the first node N1 increases to the high-level data voltage VDATA_H.

In the first period t1, the high-level data voltage VDATA_H can be sequentially supplied to all the horizontal pixel lines HL1 to HLn such that data can be written to each pixel.

Figure 6:
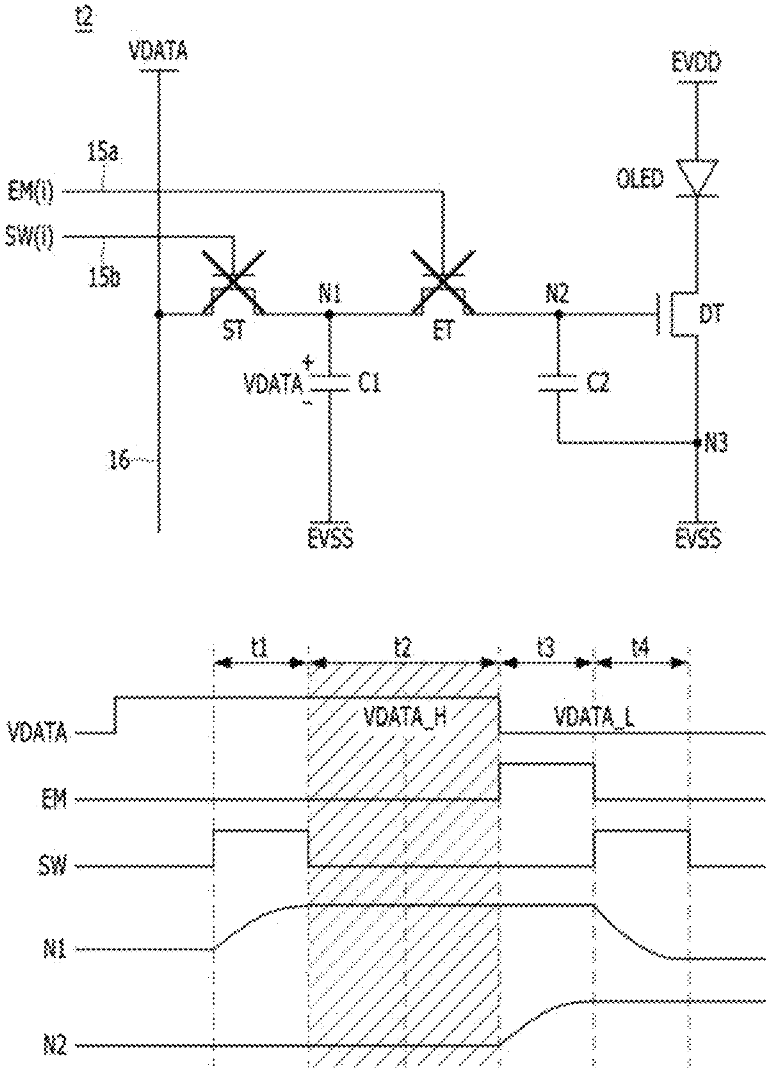

FIG. 6 is a diagram for describing the operation of the pixel in the second period t2.

Referring to FIG. 6, in the second period t2, the high-level data voltage VDATA_H is applied to the data line 16, the switch signal SW is applied at the off level, and the emission signal EM is applied at the off level. Accordingly, in the second period t2, the switch TFT ST is turned off by receiving the off-level switch signal SW, and the light emitting TFT ET is also turned off by receiving the off-level emission signal EM.

As the switch TFT ST is turned off, the data line 16 and the first node N1 are maintained in a disconnected state. Since the light emitting TFT ET is also in an off state, the first capacitor C1 connected to the first node N1 maintains a state in which the high-level data voltage VDATA_H is charged therein.

Since the display device of the present disclosure performs control such that the pixels simultaneously emit light upon completion of data writing in the horizontal pixel lines HL1 to HLn, data writing to each of the horizontal pixel lines is performed during the second period t2. Accordingly, the duration of the second period t2 can be longer for a pixel in which data has been written earlier, and thus the duration of the second period t2 can vary according to the horizontal pixel line to which a pixel belongs.

Figure 7:
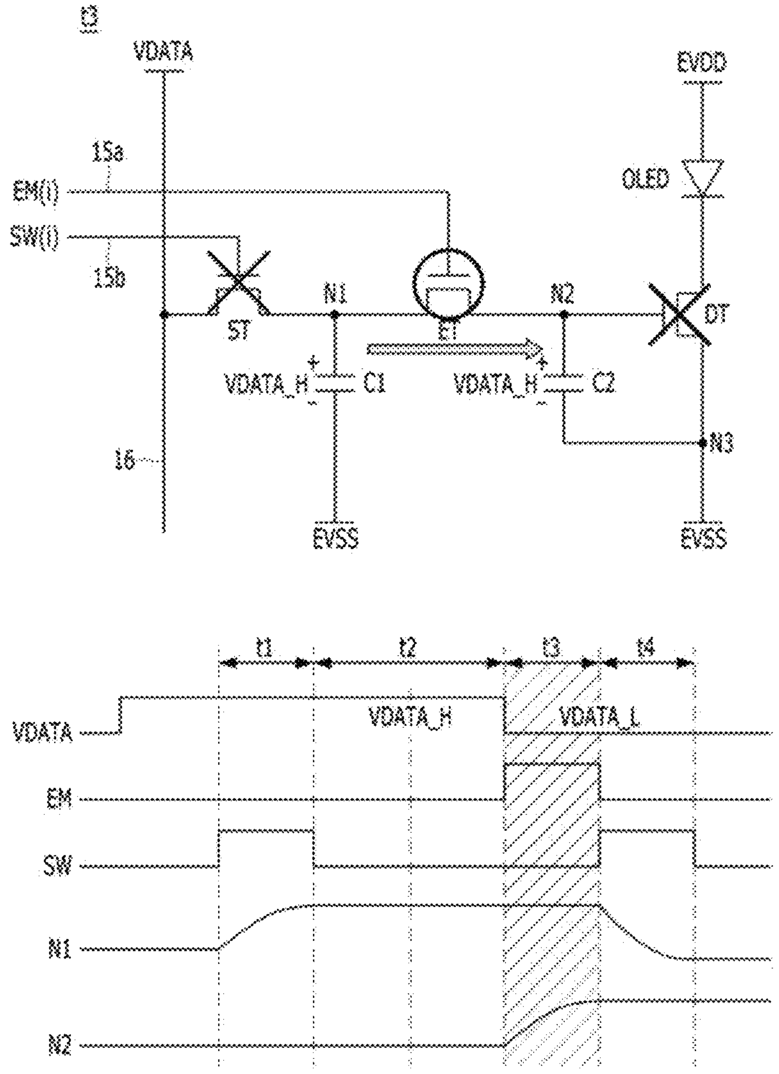

FIG. 7 is a diagram for describing the operation of the pixel in the third period t3.

Referring to FIG. 7, in the third period t3, the low-level data voltage VDATA_L is applied to the data line 16, the switch signal SW is applied at the off level, and the emission signal EM is applied at the on level. Accordingly, during the third period t3, the switch TFT ST is turned off by receiving the off-level switch signal SW, and the light emitting TFT ET is turned on by receiving the on-level emission signal EM.

As the switch TFT ST is turned off, the data line 16 and the first node N1 are maintained in a disconnected state. The light emitting TFT ET is turned on and thus the first node N1 and the second node N2 are connected. Accordingly, the potential of the first node N1 is also reflected in the second node N2, and thus the high-level data voltage VDATA_H is charged in the second capacitor C2. Accordingly, the potential of the second node N2 increases to the high-level data voltage VDATA_H.

Figure 8:
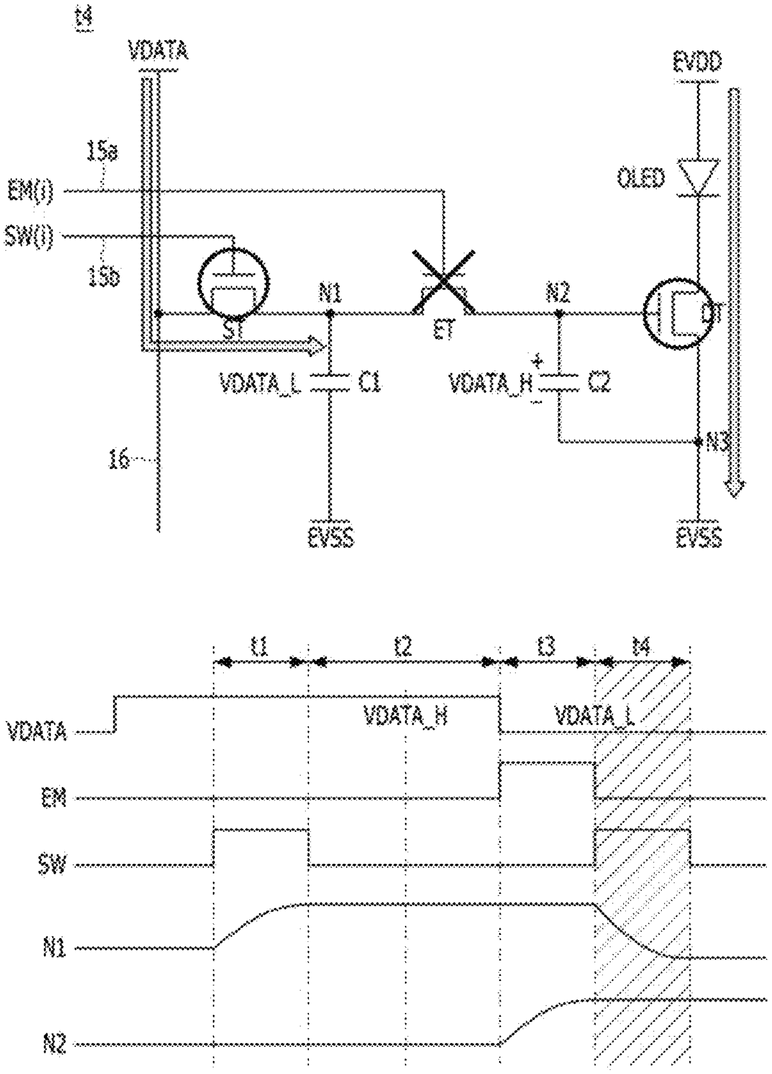

FIG. 8 is a diagram for describing the operation of the pixel in the fourth period t4.

Referring to FIG. 8, in the fourth period t4, the low-level data voltage VDATA_L is applied to the data line 16, the switch signal SW is applied at the on level, and the emission signal EM is applied at the off level. Accordingly, during the fourth period t4, the switch TFT ST is turned on by receiving the on-level switch signal SW, and the light emitting TFT ET is turned off by receiving the off-level emission signal EM.

As the switch TFT ST is turned on, the data line 16 and the first node N1 are connected. Accordingly, the low-level data voltage VDATA_L input through the data line 16 is transferred to the first node N1. Accordingly, the potential of the first node N1 gradually decreases from the high-level data voltage VDATA_H to the low-level data voltage VDATA_L.

As the light emitting TFT ET is turned off, connection between the first node N1 and the second node N2 is canceled.

The driving TFT DT is turned on by the high-level data voltage VDATA_H charged in the second capacitor C2 connected between the second node N2 serving as the gate node and the third node N3 serving as the source node. When the driving TFT DT is turned on, a current path is generated from the high-level driving voltage EVDD to the low-level driving voltage EVSS through the OLED and the driving TFT DT, and thus the OLED emits light. Since the amount of current flowing through the driving TFT DT is controlled according to the gate-source voltage Vgs of the driving TFT DT, the magnitude of driving current input to the OLED can be controlled according to the high-level data voltage VDATA_H charged in the second capacitor C2, and as a result, the emission luminance of the OLED can be adjusted.

Figure 9:
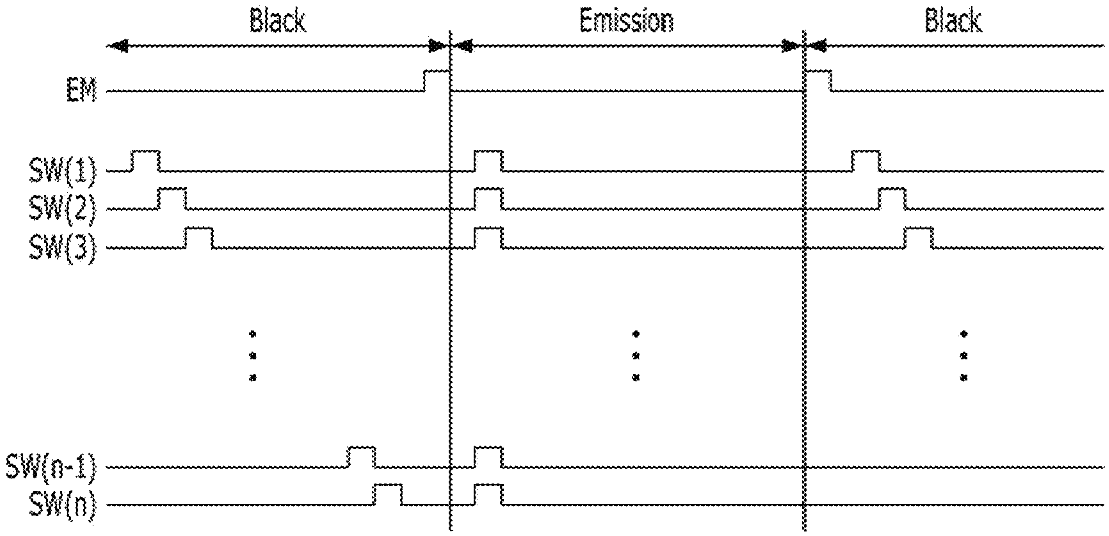
FIG. 9 is a diagram for describing a method for driving an electroluminescent display device according to a first aspect of the present disclosure.

FIG. 9 is a diagram for describing a method for driving an electroluminescent display device according to a first aspect of the present disclosure.

Referring to FIG. 9, the electroluminescent display device according to the first aspect performs BDI operation including a period (Black) in which OLEDs maintain an off state to display a black screen and an emission period (Emission) in which OLEDs emit light to display an image.

In the period (Black) in which the black screen is displayed, switch signals are sequentially input to the horizontal pixel lines of the display panel and thus image data VDATA is written. Upon completion of data writing in all horizontal pixel lines, the OLEDs of all the horizontal pixel lines emit light to display image data.

For this operation, the gate driver 13 sequentially inputs switch signals SW to all the horizontal pixel lines during the period (Black) in which the black screen is displayed. When the display panel has n horizontal pixel lines HL1 to HLn, the gate driver 13 sequentially inputs n switch signals SW1 to SWn to the horizontal pixel lines HL1 to HLn. The data driver 12 sequentially supplies image data VDATA to the horizontal pixel lines HL1 to HLn in accordance with the operation of the gate driver 13.

Upon completion of data writing to the n horizontal pixel lines HL1 to HLn, an emission signal EM is simultaneously input to the n horizontal pixel lines HL1 to HLn. Accordingly, the OLEDs of all the horizontal pixel lines simultaneously emit light to display image data.

In the conventional driving method, the horizontal pixel lines HL1 to HLn sequentially emit light and thus an EVSS rising phenomenon in which the potential of the low-level driving voltage EVSS rises while OLEDs emit light can occur. Accordingly, it is necessary to compensate for image data VDATA in consideration of EVSS rising in the conventional driving method. On the other hand, in the electroluminescent display device according to the first aspect of the present disclosure, the influence of EVSS rising can be removed because image data VDATA is written during the period (Black) in which the black screen is displayed, that is, all OLEDs are turned off. In addition, since the OLEDs of all horizontal pixel lines simultaneously emit light and thus have the same emission duty, it is possible to prevent or reduce luminance deviation from being recognized due to emission duty differences between pixel lines.

Figure 10:
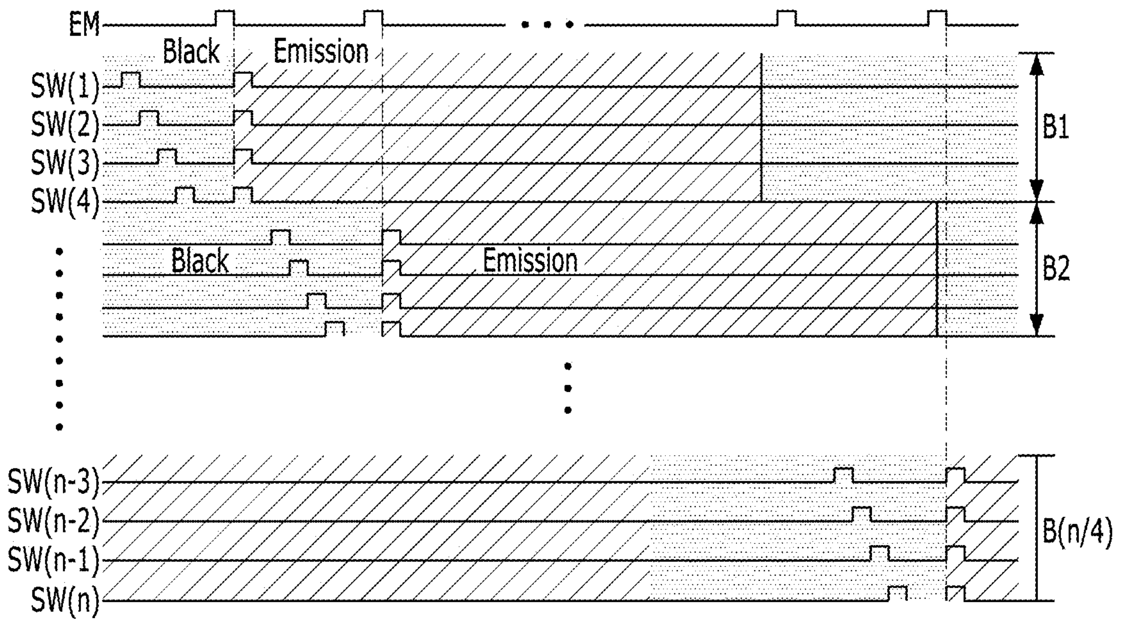
FIG. 10 is a diagram for describing a method for driving an electroluminescent display device according to a second aspect of the present disclosure.

FIG. 10 is a view for describing a method for driving an electroluminescent display device according to a second aspect of the present disclosure.

Referring to FIG. 10, the electroluminescent display device according to the second aspect can perform black data insertion (BDI) operation in which all horizontal pixel lines HL1 to HLn are divided into a plurality of blocks B1 to Bm and image data VDATA writing and emission operations are controlled in units of blocks.

In each block, image data VDATA is sequentially written during a period in which a black screen is displayed, and the horizontal pixel lines of the corresponding block simultaneously emit light to display the image data upon completion of data writing to the corresponding block. When writing of image data VDATA to the previous block is completed, data writing to the next block can start and can be performed while a black screen is displayed during the emission period of the previous block. In this way, data writing and light emission operations can be sequentially performed in each of the blocks B1 to Bm to display one frame.

The method for driving the electroluminescent display device according to the second aspect can extend emission time as compared to the driving method of the first aspect. On the other hand, since data writing to the next block is performed while the previous block is in an emission state, the EVSS rising phenomenon can occur. Accordingly, it is necessary to compensate for image data VDATA in consideration of EVSS rising.

Figure 11:
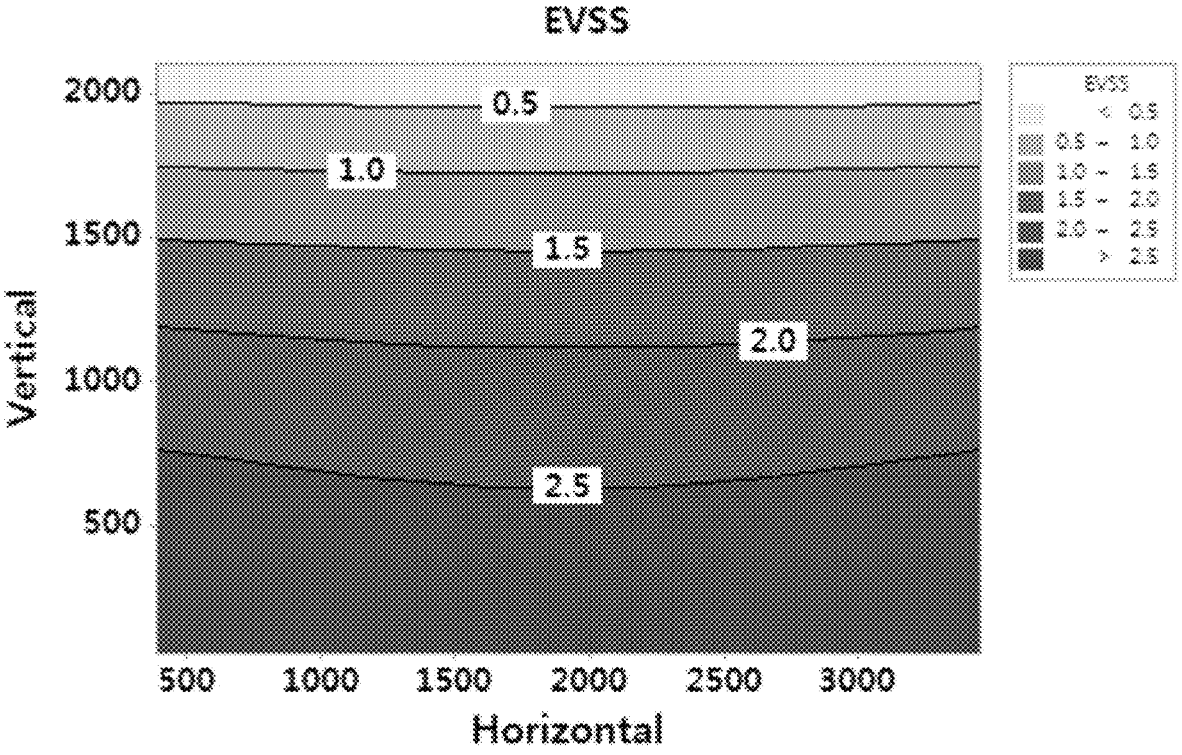
FIGS. 11 to 13 are diagrams for describing an EVSS rising compensation method during the operation of the electroluminescent display device according to the second aspect.
Figure 12:
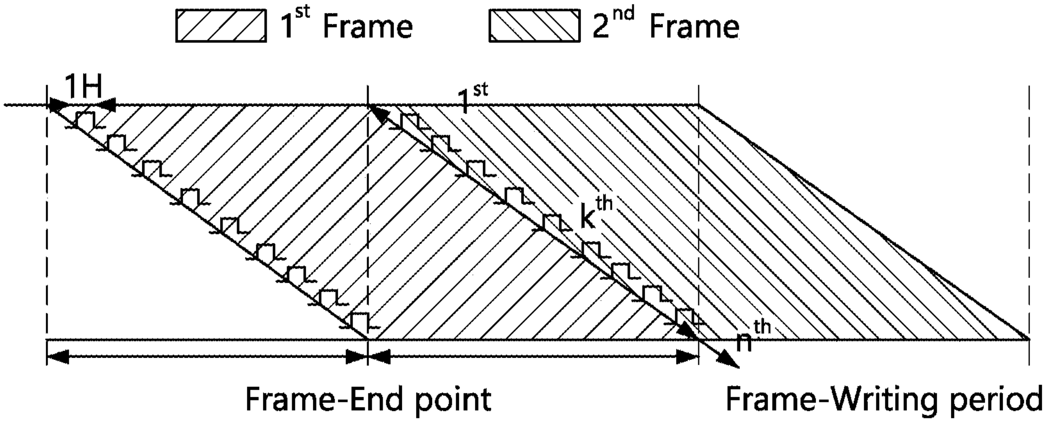
Figure 13:
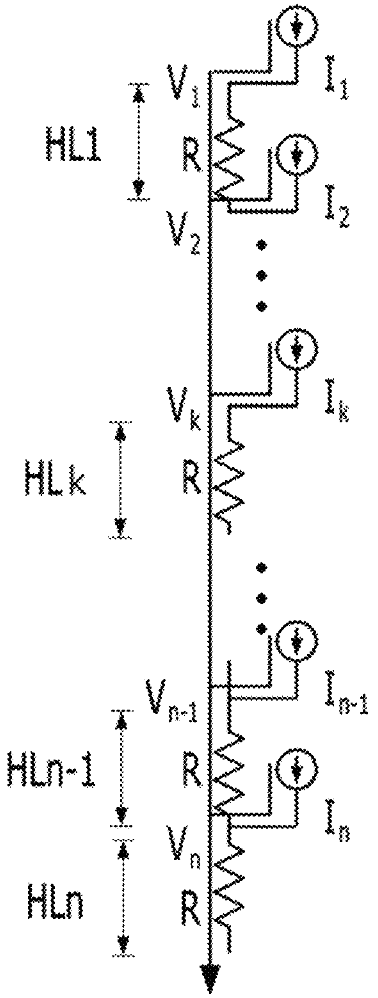

FIGS. 11 to 13 are diagrams for describing a method for compensating for an EVSS variation value when an electroluminescent display device is driven.

FIG. 11 is a graph showing results of simulations of EVSS variation occurring when image data is input.

The simulation graph of FIG. 11 shows results of simulating changes in an EVSS value when a data driver is positioned at the top of a display device having vertical numbers of 0 to 2101 and supplies image data.

According to the simulation graph, when the display panel is driven, EVSS rises and EVSS is measured as 2.5 V or higher in a range of vertical numbers of 500 to 1000, is measured as 2.0 V in a range of vertical numbers of 1000 to 1500, is measured as 1.5 V near the vertical number of 1500, gradually decreases to 1.0 V in a range of vertical number of 1500 to 2000, and is measured as about 0.5 V near the vertical number of 2000 to which image data is lastly supplied.

That is, it can be ascertained that the longer the distance from the data driver, the higher the EVSS rise. If the EVSS value increases, the luminance decreases even when data of the same grayscale is input. The simulation results of FIG. 11 are results of simulating an EVSS value for each horizontal pixel line on the assumption that the current $I_{PXL}$ flowing through the OLED of one pixel is 1.4 μA and resistance is 0.77. It can be ascertained from the simulation results that there is a difference of about 2.4 V between the upper limit and lower limit EVSS values. When there is an EVSS difference in this manner, there can be a difference of about 87% between luminances of upper and lower parts of the display panel at the same grayscale. In order to improve such luminance non-uniformity, a data voltage can be compensated by reflecting EVSS variation therein.

FIG. 12 is a diagram for describing an operation time for compensating for change in EVSS, and FIG. 13 is an equivalent circuit diagram of one vertical line of the display panel.

Referring to FIGS. 12 and 13, EVSS for each position is stored at a point in time at which a first frame ends (Frame-End) in order to compensate for EVSS variation. When the display panel includes n horizontal pixel lines HL1 to HLn, n voltage values can be stored in one vertical line.

Thereafter, during data writing for driving the next second frame (Frame-Writing), EVSS variation is calculated using the EVSS voltages stored at the point in time at which the previous frame ends. Thereafter, the voltage of image data can be compensated by reflecting the EVSS variation. FIG. 13 is an equivalent circuit diagram of one vertical line of the display panel. The display panel includes first to n-th horizontal pixel lines HL1 to HLn, data is input in the order of the first horizontal pixel line HL1 to the n-th horizontal pixel line HLn, and OLEDs emit light in the same order.

In the present aspect, the data driver supplying data voltages is positioned adjacent to the n-th horizontal pixel line HLn, that is, at the lower end of the figure. Resistors R on the vertical line represent resistances of pixels, and currents $I_1$ to $I_n$ are currents applied to the pixels. The arrow direction of the currents indicates current flow when OLEDs emit light.

On the assumption that the current of the pixels flows from the first horizontal pixel line HL1 to the n-th horizontal pixel line HLn, the voltage of each pixel can be calculated as the product of the resistance and current of the corresponding pixel (V=IR).

EVSS voltages V1 to Vn of pixel lines at a point in time at which a frame ends (Frame-End) can be calculated by the following calculation method. Here, the point in time at which a frame ends (Frame-End) is a point in time at which emission ends in the first horizontal pixel line HL1 and emission starts in the n-th horizontal pixel line HLn, as shown in FIG. 12.

<EVSS Voltages at Frame-End>

$$V_1 = V_2 + IS_1 * R = \sum_{k=1}^{n} IS_k * R$$

$$V_2 = V_3 + IS_2 * R = \sum_{k=2}^{n} IS_k * R$$

$$\vdots$$

$$V_k = V_{k+1} + IS_k * R = \sum_{k=k}^{n} IS_k * R$$

$$\vdots$$

$$V_{n-1} = V_n + IS_{n-1} * R = \sum_{k=n-1}^{n} IS_k * R$$

$$V_n = IS_n * R = IS_n * R$$

Here, $$IS_k = \sum_{j=1}^{k} I_1 (j = \text{vertical number}).$$

Accordingly, $IS_1=I_1$, $IS_2=I_1+I_2$, $IS_3=I_1+I_2+I_3$. The voltage at a point $V_1$ is the sum of the voltage at a point $V_2$ and a voltage $I_1$*R obtained by multiplying $I_1$ by resistance. That is, $V_1=V_2+IS_1*R$. In the same manner, the voltage at the point $V_2$ is the sum of the voltage at a point $V_3$ and a voltage obtained by multiplying $I_1+I_2$ by resistance. That is, $V_2=V_3+IS_2*R$. Here, since $V_1=V_2+IS_1*R$ and $V_2=V_3+IS_2*R$, it can be represented as $V_1=V_3+(IS_1+IS_2)*R$. If $V_3$ in the formula for calculating $V_1$ is substituted with $V_4$ in the same manner and finally Vn is substituted with ISn*R, $V_1$ can be represented as $$V_1 = \sum_{k=1}^{n} IS_k * R.$$

Through the above calculation method, the voltage at the point in time at which the frame ends can be calculated.

Thereafter, when data of the next frame is written, an EVSS variation is calculated using the EVSS voltage calculated at the point in time at which the previous frame ends (Frame-End), and a data voltage to be written is compensated by reflecting the calculated EVSS variation. Here, for a region with respect to a black screen, current is replaced with 0 and stored.

In the frame-writing period for driving a frame, EVSS variation can be calculated by the following calculation method. The prime symbol (') in the calculation formula means a value calculated in the previous frame.

<EVSS Variation in Frame-Writing Period>

$$V_1 = V_1'$$

$$V_2 = V_2' + (IS_1 - IS_1')*R*(n-1)$$

$$\vdots$$

$$V_k = V_k' + (IS_{k-1} - IS_{k-1}')*R*(n+1-k)$$

$$\vdots$$

$$V_{n-1} = V_{n-1}' + (IS_{n-2} - IS_{n-2}')*R*2$$

$$V_n = V_n' + (IS_{n-1} - IS_{n-1}')*R$$

As shown in FIG. 12, light emission in the first horizontal pixel line HL1 is completed at the point in time at which the previous frame ends (Frame-End), and thus data of the next frame is written. Accordingly, since the voltage of the first horizontal pixel line HL1 does not change after the voltage $V_1$ is calculated until data of the next frame is written, $V_1=V_1'$ is calculated.

The voltage $V_2$ of the second horizontal pixel line HL2 is calculated by reflecting change in the current of the first horizontal pixel line HL1 since the current of the first horizontal pixel line HL1 has changed at the point in time at which the frame ends (Frame-End). The current change is calculated by subtracting current $IS_1'$ flowing through the first line in the previous frame from current $IS_1$ to be applied to the first line in the current frame, and $V_2$ in the current frame can be calculated by multiplying the current change by resistance R*(n−1) that leads to the data driver.

A target luminance can be obtained even if EVSS changes by reflecting the EVSS value calculated as described above in a data voltage for data writing to calculate a compensated data voltage and writing the compensated data voltage.

The above-described processes for calculating and compensating for EVSS can be performed under the control of the timing controller 11 along with compensation functions such as driving TFT compensation and OLED compensation, but are not limited thereto.

As described above, in order to compensate for EVSS variation, an EVSS variation value of the corresponding line is calculated before data is written, and then a data voltage compensated by reflecting the EVSS variation value is supplied. Since data is written and light is emitted in units of one horizontal pixel line, an EVSS variation value is calculated and compensation according thereof is performed based on one horizontal pixel line. In this way, when all horizontal pixel lines HL1 to HLn are divided into a plurality of blocks B1 to Bm, image data VDATA is written in units of blocks, and horizontal pixel lines of the corresponding block simultaneously emit light upon completion of data writing as in the second aspect of the present disclosure, EVSS can be calculated at each timing of light emission in units of blocks. For example, when data writing of the previous block is completed and light emission starts, an EVSS variation value of the next block can be calculated to compensate for a data voltage and then the compensated data voltage can be written.

As described above, in the method for driving an electroluminescent display device according to the first aspect of the present disclosure, image data VDATA is written during the period (Black) in which the black screen is displayed while OLEDs are maintained in the off state, and OLEDs of all horizontal pixel lines simultaneously emit light to display the image data upon completion of data writing. In a state in which all OLEDs are turned off, the image data VDATA is written and thus the influence of EVSS rising can be eliminated. Since the OLEDs of all horizontal pixel lines simultaneously emit light and thus have the same emission duty, it is possible to prevent or reduce luminance deviation from being recognized due to emission duty differences between lines.

In the method for driving an electroluminescent display device according to the second aspect of the present disclosure, the operation of writing image data VDATA and the emission operation can be controlled in units of blocks by dividing all horizontal pixel lines HL1 to HLn into a plurality of blocks B1 to Bm. Since the data writing and emission operations are performed in units of blocks B1 to Bm to display one frame, the method for driving an electroluminescent display according to the second aspect can extend emission time as compared to the driving method of the first aspect.

The pixel circuit of the present disclosure for implementing the driving methods of the first and second aspects of the present disclosure can include three TFTs DT, ST, and ET and two capacitors C1 and C2 and can be connected to one data line 16 without a separate reference line Vref. In the pixel circuit of the present disclosure, an image data voltage can be stored in the first capacitor C1 during a period (Black) when a black screen is displayed and the image data voltage can be transferred to the second capacitor C2 that controls the gate-source voltage of the driving TFT when an emission signal EM is input.

Those skilled in the art will appreciate that various modifications and variations can be made in the present disclosure without departing from the spirit or scope of the disclosure. Accordingly, the present disclosure should not be limited to the specific aspects described herein, but should be accorded the broadest scope consistent with the principles and novel features disclosed herein.

What is claimed is:

1. An electroluminescent display device comprising:

a display panel including a plurality of pixels each having a light emitting element, a driving thin film transistor for controlling a driving current flowing through the light emitting element, a first capacitor connected to a first node to be charged and discharged based on a data voltage applied to a data line, a second capacitor connected to a second node and a source node of the driving thin film transistor, and a control circuit;

a panel driver connected to the data line and a gate line;

a timing controller configured to:

divide an operation cycle into an emission period in which the light emitting element emits light and a non-emission period in which light emission is stopped, and provide a data voltage through the data line during the non-emission period for sequentially controlling light emitting elements, wherein the control circuit is configured to concurrently couple the data voltage to the driving thin film transistor and emit light from the light emitting elements during the emission period, wherein the control circuit comprises a buffer transistor to store the data voltage before the emission period and discharge the data voltage stored in the first capacitor using the buffer transistor based on a low voltage of the data line, when the emission period ends.

2. The electroluminescent display device according to claim 1, wherein the timing controller is configured to display an image during the emission period and a black image is displayed during the non-emission period to control black data insertion.

3. The electroluminescent display device according to claim 2, wherein during the non-emission period, the data voltage is sequentially written to the control circuit of the plurality of pixels, and the light emitting element is turned off to display the black image.

4. The electroluminescent display device according to claim 1, wherein the timing controller is configured to sequentially provide the data voltage to all pixel lines of the display panel during the non-emission period and all the pixel lines simultaneously emit light during the emission period.

5. The electroluminescent display device according to claim 1, wherein the timing controller is configured to divide horizontal pixel lines of the display panel into a plurality of blocks and sequentially provide the data voltage in units of the divided blocks and horizontal pixel lines simultaneously emit light in units of blocks.

6. The electroluminescent display device according to claim 5, wherein the timing controller is configured to compensate for the data voltage based on a change in a low-level voltage according to light emission of the light emitting elements.

7. The electroluminescent display device according to claim 1, wherein the panel driver includes:

a data driver configured to supply the data voltage to the data line; and a gate driver configured to sequentially output switch signals for inputting the data voltage and to simultaneously output an emission signal to pixels to which the data voltage is applied.

8. An electroluminescent display device comprising:

a display panel in which a plurality of data lines intersect a plurality of gate lines and a plurality of pixels is disposed;

a data driver configured to supply a variable data voltage to the plurality of data lines; and a gate driver configured to sequentially output switch signals for inputting the data voltage and to simultaneously output an emission signal to a plurality of pixels to which the variable data voltage is applied, wherein each of the plurality of pixels includes:

a light emitting element having an anode to which a high-level driving voltage is applied;

a driving transistor connected between a cathode of the light emitting element and a low-level driving voltage to control a driving current of the light emitting element according to a voltage difference between a gate and a source;

a switching transistor configured to connect a corresponding data line and a first node according to a corresponding switch signal;

a light emitting transistor configured to connect the first node and a second node according to the emission signal;

a first capacitor connected to the first node to be charged based on the variable data voltage applied to the data line while the corresponding data line is connected to the first node and discharged based on a low voltage of the data line, when the emission signal ends; and a second capacitor connected to the second node and a source node of the driving transistor to be charged with the variable data voltage charged in the first capacitor as a gate-source voltage of the driving transistor when the emission signal is input.

9. The electroluminescent display device according to claim 8, wherein the first capacitor is charged with the data voltage while the light emitting element is turned off.

10. The electroluminescent display device of claim 8, wherein the light emitting transistor maintains an off state such that the data voltage is charged in the first capacitor when the switching transistor is turned on, and the switching transistor maintains an off state such that the data voltage charged in the first capacitor is charged in the second capacitor when the light emitting transistor is turned on.

11. The electroluminescent display device according to claim 8, wherein, in the driving transistor, a drain electrode is connected to the cathode of the light emitting element, a source electrode is provided with the low-level driving voltage, and a gate electrode is connected to the second node to control a magnitude of the driving current applied to the light emitting element according to a magnitude of the data voltage charged in the second capacitor.

12. An electroluminescent display device comprising:

a light emitting element having an anode to which a high-level driving voltage is applied;

a driving transistor connected between a cathode of the light emitting element and a low-level driving voltage to control a driving current of the light emitting element according to a voltage difference between a gate and a source;

a switching transistor configured to connect a data line and a first node according to a switch signal from a timing controller;

a first capacitor connected to the first node to be charged based on a variable data voltage input to the data line while the data line is connected to the first node based on the switch signal and discharged based on a low voltage of the data line, when an emission signal ends;

a light emitting transistor configured to connect the first node and a second node according to the emission signal; and a second capacitor connected to the second node and a source node of the driving transistor.

13. The electroluminescent display device according to claim 12, wherein the first capacitor is charged with the data voltage while the light emitting element is turned off.

14. The electroluminescent display device according to claim 12, wherein the second capacitor is charged with the data voltage charged in the first capacitor as a gate-source voltage of the driving transistor when the emission signal is input.

15. The electroluminescent display device according to claim 12, wherein the light emitting transistor maintains an off state such that the data voltage is charged in the first capacitor when the switching transistor is turned on, and the switching transistor maintains an off state such that the data voltage charged in the first capacitor is charged in the second capacitor when the light emitting transistor is turned on.

16. The electroluminescent display device according to claim 12, wherein a driving period for light emission of the light emitting element includes first to fourth periods, the switching transistor is turned on and the light emitting transistor is turned off such that the data voltage is charged in the first capacitor in the first period, the switching transistor and the light emitting transistor are turned off such that the data voltage is held in the first capacitor in the second period, the switching transistor is turned off and the light emitting transistor is turned on such that the data voltage is charged in the second capacitor in the third period, and the driving transistor is turned on according to the data voltage charged in the second capacitor to apply driving power to the light emitting element in the fourth period.

* * * * *